(12) United States Patent
Hirano

(10) Patent No.: US 7,855,489 B2
(45) Date of Patent: Dec. 21, 2010

(54) MICROACTUATOR SUBSTRATE

(75) Inventor: Toshiki Hirano, San Jose, CA (US)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 934 days.

(21) Appl. No.: 11/701,274

(22) Filed: Jan. 31, 2007

(65) Prior Publication Data

US 2008/0180846 A1 Jul. 31, 2008

(51) Int. Cl.
H01L 41/08 (2006.01)

(52) U.S. Cl. .................................................. 310/328

(58) Field of Classification Search ................. 310/328
See application file for complete search history.

(56) References Cited

U.S. PATENT DOCUMENTS

| | | | | |
|---|---|---|---|---|
| 4,995,025 A | * | 2/1991 | Schulze | 369/222 |
| 5,508,857 A | * | 4/1996 | Horita | 360/75 |
| 5,764,444 A | * | 6/1998 | Imamura et al. | 360/294.4 |
| 6,078,468 A | * | 6/2000 | Fiske | 360/97.01 |
| 6,222,706 B1 | * | 4/2001 | Stefansky et al. | 360/294.5 |
| 6,239,947 B1 | | 5/2001 | Fan et al. | |
| 6,239,953 B1 | * | 5/2001 | Mei | 360/294.6 |
| 6,515,834 B1 | * | 2/2003 | Murphy | 360/294.4 |
| 6,611,399 B1 | | 8/2003 | Mei et al. | |
| 6,760,195 B2 | * | 7/2004 | Rafaelof | 360/264.3 |
| 6,760,196 B1 | * | 7/2004 | Niu et al. | 360/294.6 |
| 6,785,086 B1 | | 8/2004 | Bonin et al. | |
| 6,943,990 B1 | | 9/2005 | Yokoyama et al. | |
| 7,336,437 B2 | * | 2/2008 | Cho | 360/75 |
| 7,595,965 B1 | * | 9/2009 | Kulangara et al. | 360/294.6 |
| 2001/0046107 A1 | | 11/2001 | Irie et al. | |
| 2002/0191342 A1 | | 12/2002 | Yanagisawa | |
| 2004/0145834 A1 | | 7/2004 | Miyano et al. | |
| 2006/0044698 A1 | | 3/2006 | Hirano et al. | |
| 2009/0244786 A1 | * | 10/2009 | Hatch | 360/294.4 |

FOREIGN PATENT DOCUMENTS

| JP | 60066313 A | * | 4/1985 |
|---|---|---|---|
| JP | 03097173 A | * | 4/1991 |

* cited by examiner

Primary Examiner—J. SanMartin

(57) ABSTRACT

The substrate includes a stroke amplifier for generating an amount of amplified motion converted from a force received thereon. The substrate also includes a rotating device coupled to the stroke amplifier, the rotating device comprising supporting rotational springs. The rotating device is separate and independent from the stroke amplifier and has a center of rotation substantially proximal to a center of mass of an object disposable thereon. The rotating device causes a rotation in a portion of the substrate upon receiving said amplified motion. The substrate further includes a piezoelectric actuator that is coupled to the stroke amplifier and is for generating the force. The stroke amplifier and the rotating device are integrated within the substrate.

9 Claims, 12 Drawing Sheets

1

MICROACTUATOR SUBSTRATE

TECHNICAL FIELD

The invention relates to the field of hard disk drive development.

BACKGROUND ART

Direct access storage devices (DASD) have become part of everyday life, and as such, expectations and demands continually increase for greater speed for manipulating and for holding larger amounts of data. To meet these demands for increased performance, the mechano-electrical assembly in a DASD device, specifically the Hard Disk Drive (HDD) has evolved to meet these demands.

Advances in magnetic recording heads as well as the disk media have allowed more data to be stored on a disk's recording surface. The ability of an HDD to access this data quickly is largely a function of the performance of the mechanical components of the HDD. Once this data is accessed, the ability of an HDD to read and write this data quickly is primarily a function of the electrical components of the HDD.

A computer storage system may include a magnetic hard disk(s) or drive(s) within an outer housing or base containing a spindle motor assembly having a central drive hub that rotates the disk. An actuator includes a plurality of parallel actuator arms in the form of a comb that is movably or pivotally mounted to the base about a pivot assembly. A controller is also mounted to the base for selectively moving the comb of arms relative to the disk.

Each actuator arm has extending from it at least one cantilevered electrical lead suspension. A magnetic read/write transducer or head is mounted on a slider and secured to a flexure that is flexibly mounted to each suspension. The read/write heads magnetically read data from and/or magnetically write data to the disk. The level of integration called the head gimbal assembly (HGA) is the head and the slider, which are mounted on the suspension. The slider is usually bonded to the end of the suspension.

A suspension has a spring-like quality, which biases or presses the air-bearing surface of the slider against the disk to cause the slider to fly at a precise distance from the disk. Movement of the actuator by the controller causes the head gimbal assemblies to move along radial arcs across tracks on the disk until the heads settle on their set target tracks. The head gimbal assemblies operate in and move in unison with one another or use multiple independent actuators wherein the arms can move independently of one another.

To allow more data to be stored on the surface of the disk, more data tracks must be stored more closely together. The quantity of data tracks recorded on the surface of the disk is determined partly by how well the read/write head on the slider can be positioned and made stable over a desired data track. Vibration or unwanted relative motion between the slider and surface of disk will affect the quantity of data recorded on the surface of the disk.

To mitigate unwanted relative motion between the slider and the surface of the disk, HDD manufacturers are beginning to configure HDDs with a secondary actuator in close proximity to the slider. A secondary actuator of this nature is generally referred to as a microactuator because it typically has a very small actuation stroke length, typically plus and minus 1 micron. A microactuator typically allows faster response to relative motion between the slider and the surface of the disk as opposed to moving the entire structure of actuator assembly.

SUMMARY OF THE INVENTION

A microactuator substrate. The substrate includes a stroke amplifier for generating an amount of amplified motion converted from a force received thereon. The substrate also includes a rotating device coupled to the stroke amplifier and comprising supporting rotational springs. The rotating device is separate and independent from the stroke amplifier and has a center of rotation substantially proximal to a center of mass of an object disposable thereon. The rotating device causes a rotation in a portion of the substrate upon receiving said amplified motion. The substrate further includes a piezoelectric (PZT) actuator that is coupled to the stroke amplifier and is for generating the force. The stroke amplifier and the rotating device are integrated within the substrate.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to embodiment(s) of the present invention. While the invention will be described in conjunction with the embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

The discussion will begin with an overview of a hard disk drive and components connected within. The discussion will then focus on embodiments of the invention that provide a secondary actuator within the substrate and located near a slider. The discussion will then focus on embodiments of this invention that allow for selection of a center of rotation axis relative to a loading force and the center of mass of the slider.

Although embodiments of the present invention will be described in conjunction with a substrate of a microactuator, it is understood that the embodiments described herein are useful outside of the art of microactuators, such as devices requiring high frequency transmission between two devices that have relative motion. The utilization of the substrate of a microactuator is only one embodiment and is provided herein merely for purposes of brevity and clarity.

Overview

Figure 1:
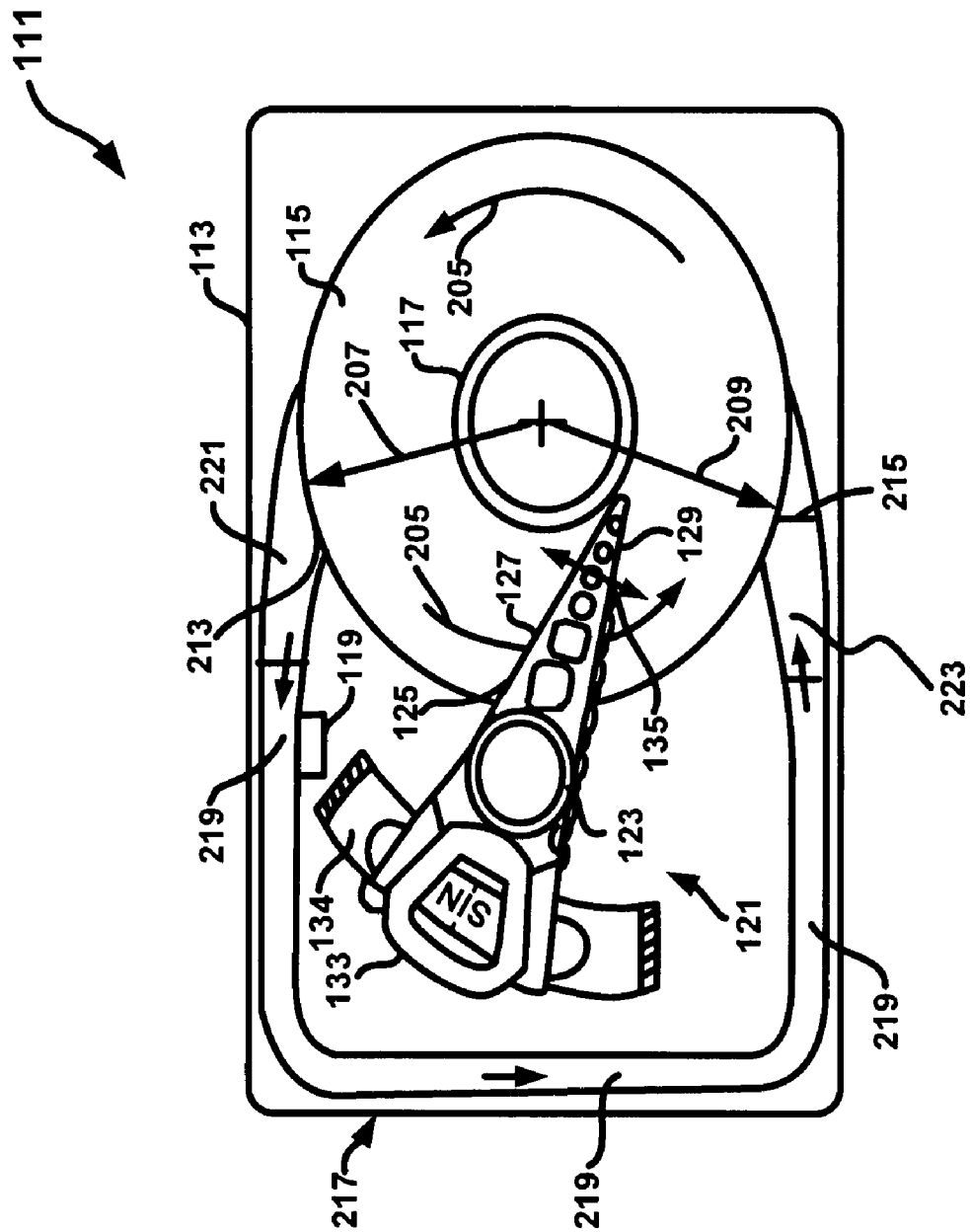
FIG. 1 is plan view of an HDD in accordance with an embodiment of the present invention.

With reference now to FIG. 1, a schematic drawing of one embodiment of an information storage system comprising a magnetic hard disk file or drive 111 for a computer system is shown. Drive 111 has an outer housing or base 113 containing a disk pack having at least one media or magnetic disk 115. A spindle motor assembly having a central drive hub 117 rotates the disk or disks 115. An actuator 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered electrical lead suspension (ELS) 127 (load beam removed). It should be understood that ELS 127 may be, in one embodiment, an integrated lead suspension (ILS) that is formed by a subtractive process. In another embodiment, ELS 127 may be formed by an additive process, such as a Circuit Integrated Suspension (CIS). In yet another embodiment, ELS 127 may be a Flex-On Suspension (FOS) attached to base metal or it may be a Flex Gimbal Suspension Assembly (FGSA) that is attached to a base metal layer. The ELS may be any form of lead suspension that can be used in a Data Access Storage Device, such as a HDD. A magnetic read/write transducer or head is mounted on a slider 129 and secured to a flexure that is flexibly mounted to each ELS 127. The read/write heads magnetically read data from and/or magnetically write data to disk 115. The level of integration called the head gimbal assembly is the head and the slider 129, which are mounted on suspension 127. The slider 129 is usually bonded to the end of ELS 127

ELS 127 has a spring-like quality, which biases or presses the air-bearing surface of the slider 129 against the disk 115 to cause the slider 129 to fly at a precise distance from the disk. ELS 127 has a hinge area that provides for the spring-like quality, and a flexing interconnect (or flexing interconnect) that supports read and write traces through the hinge area. A voice coil 133, free to move within a conventional voice coil motor magnet assembly 134 (top pole not shown), is also mounted to arms 125 opposite the head gimbal assemblies. Movement of the actuator 121 (indicated by arrow 135) by controller 119 causes the head gimbal assemblies to move along radial arcs across tracks on the disk 115 until the heads settle on their set target tracks. The head gimbal assemblies operate in a conventional manner and move in unison with one another, unless drive 111 uses multiple independent actuators (not shown) wherein the arms can move independently of one another.

Figure 2:
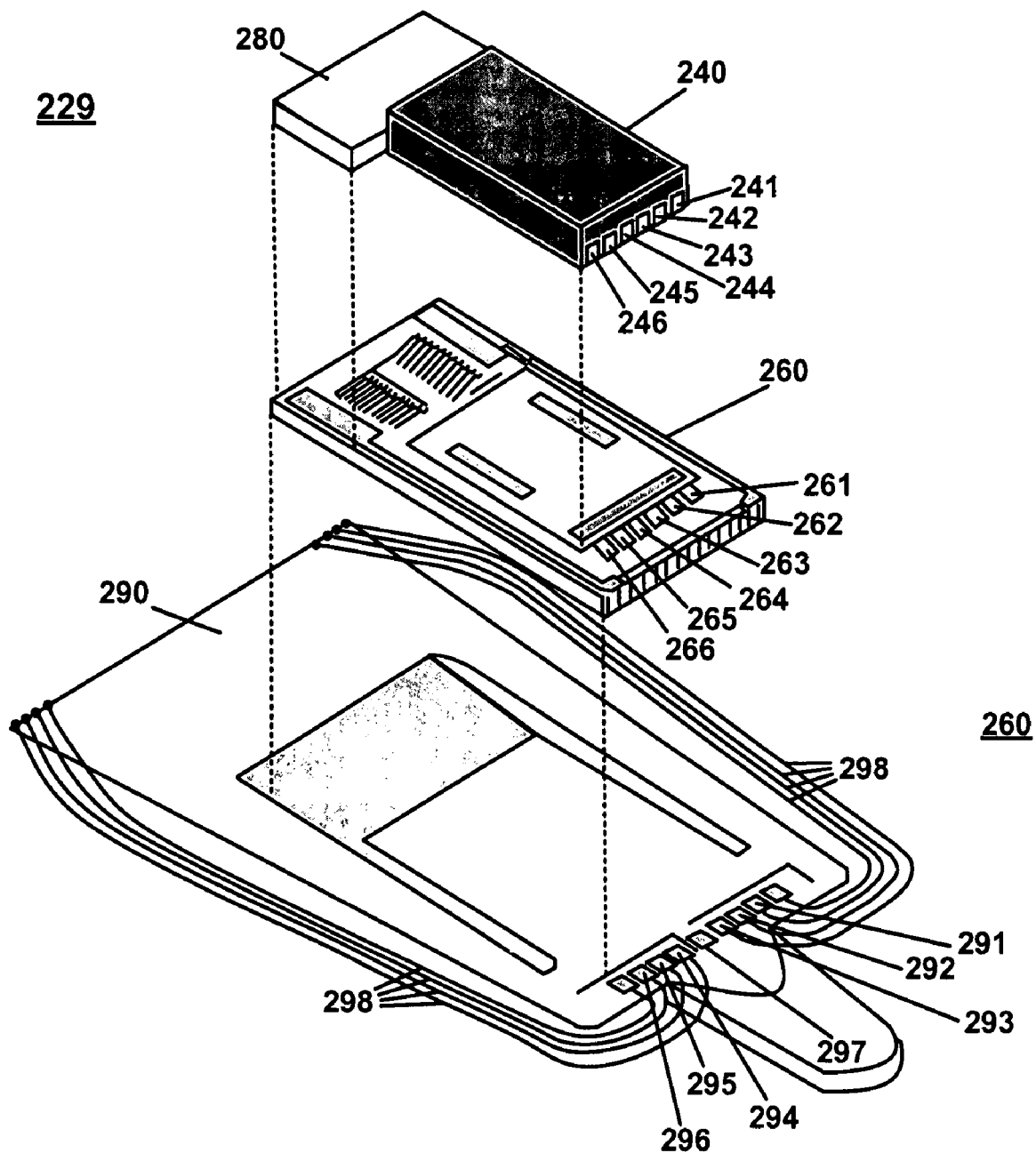
FIG. 2 is an inverted isometric view of the slider assembly of FIG. 1, in accordance with an embodiment of the present invention.

FIG. 2 is an inverted isometric view of an HGA 229, which is an assembly of slider 129 and an ELS 127 of FIG. 1. HGA 229 shown to include a piezoelectric ceramic 280, a read/write transducer (magnetic head) 240, a microactuator 260, and a suspension 290, each of which are intercommunicatively coupleable and within which microactuator 260 is interposed between magnetic head 240 and suspension 290. In the embodiment shown, microactuator 260 includes a plurality of component data interconnects or data transmission lines terminating in slider bonding pads 261, 262, 263, 264, 265 and 266, and magnetic head 240 includes a plurality of data transmission lines terminating in transducer bonding pads 241, 242, 243, 244, 245 and 246. It is noted that each data communication line associated with each transducer bonding pad 241-246 or slider bonding pad 261-266 may terminate within and/or couple with another line within and/or provide an additional externally accessible communicative connection for the component in which it is disposed. It is further noted that slider bonding pad 261 of microactuator 260 is associated with transducer bonding pad 241 of magnetic head 240; slider bonding pad 262 is associated with transducer bonding pad 242, and so on.

Although six bonding pads are shown on microactuator 260 of FIG. 2, it is noted that microactuator 260 may be configured to have a greater or lesser number of bonding pads.

Although embodiments of the present invention are described in the context of a microactuator in an information storage system, it should be understood that embodiments may apply to devices utilizing an electrical interconnect. For example, embodiments of the present invention may apply to rigid printed circuit boards. More specifically, embodiments of the present invention may be used in printed circuit boards that are used for high speed signal processing. Embodiments of the present invention are also suitable for use in flexing circuits, e.g., flexing circuits for digital cameras and digital camcorders. The signal traces may also be replaced with power traces according to one embodiment.

Figure 3:
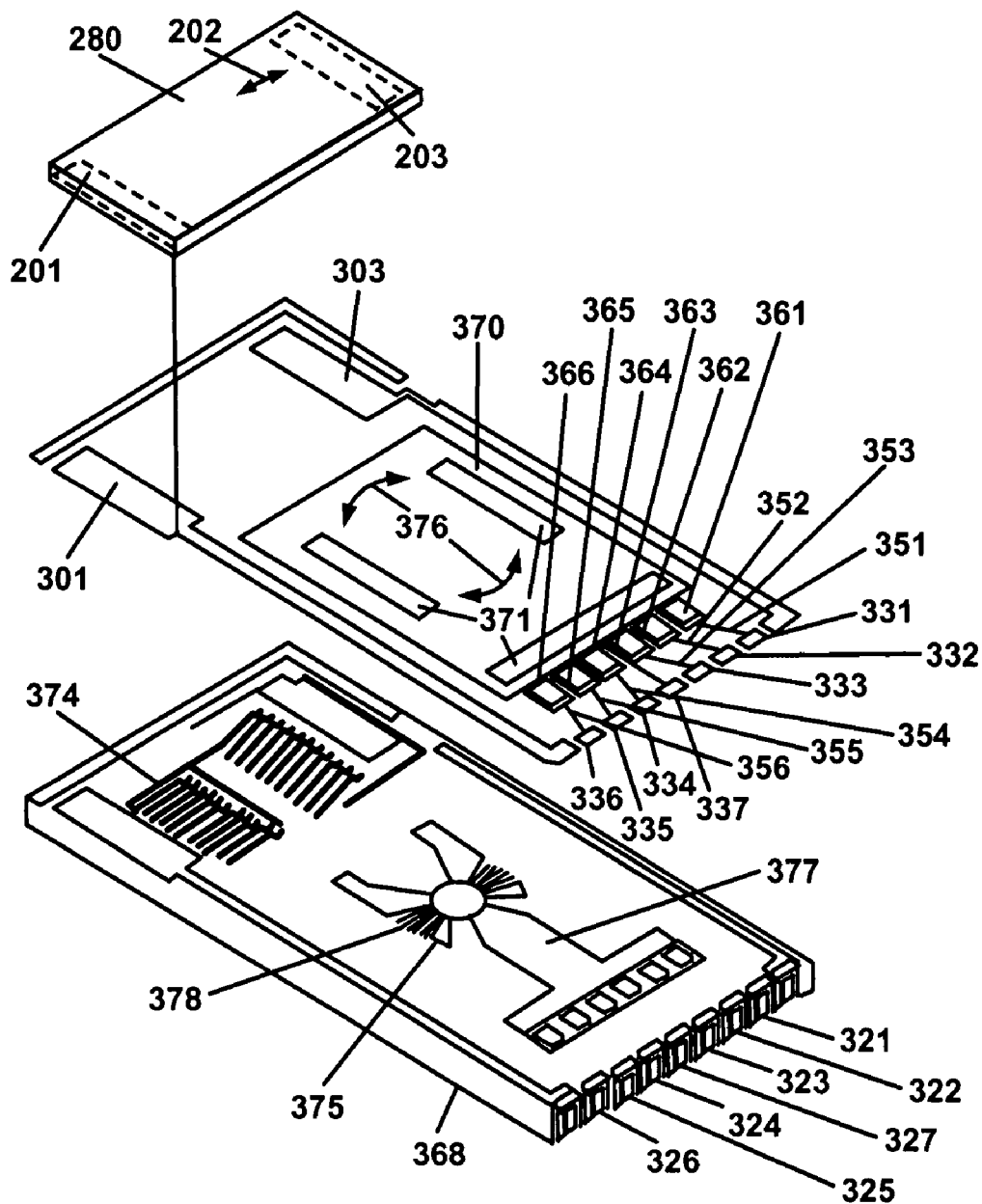
FIG. 3 is an isometric view of the microactuator assembly of FIG. 2, in an embodiment of the present invention.

In the embodiment shown, suspension 290 includes a base-metal layer which can be comprised in part of stainless steel. Suspension 290 further includes a plurality of communication lines 298, each having an end communicatively coupling suspension 290 to the system in which it is implemented, e.g., actuator 121 of hard disk drive 111 of FIG. 1, and an alternative end terminating at a suspension bonding pad, e.g., suspension bonding pads 291-296. Each suspension bonding pad 291-296 provides communicative connectivity with an associated bonding pad of a microactuator, e.g., bonding pads 261-266 of microactuator 260, in an embodiment of the present invention. An associated plurality of flexible wires, e.g. flexible wires 351-356 of slider bonding platform 370 of FIG. 3, provide a flexible interconnect between slider bonding pads 261-266 of microactuator 260 and bonding pads 291-296 of suspension 290. In an embodiment of the present invention, pads 261-266 may be separated from bonding platform 370 by a small gap. Although stainless steel is stated herein as the base-metal layer, it is appreciated that alternative metals, and/or combinations thereof, may be utilized as the base-metal layer of suspension 290.

FIG. 3 is an isometric view of the microactuator assembly shown in FIG. 2, e.g., microactuator 260. FIG. 3 shows microactuator assembly 360 to include a substrate 368, a slider bonding platform 370 and a piezoelectric ceramic, e.g., PZT 280 of FIG. 2, in an embodiment of the present invention. Platform 370 is configured to receive thereon, and communicatively couple to, a read/write transducer, e.g. slider 240 of FIG. 2. A piezoelectric ceramic 280 is shown disposed proximal to slider 240 (when slider 240 is so disposed) and is bonded to bonding pad 202 and 203. A PZT ceramic, e.g., PZT 280, can be comprised of Pb—Zr—Ti oxide (lead-zirconium-titanium). Slider bonding platform 370 is shown as interposed between substrate 368 and slider 240 (when present) and rotates, indicated by arrows 376, relative to the fixed portion of substrate 368.

Microactuator 360 additionally includes a spacer layer 377. Spacer layer 377 is shown disposed on a plurality of locations on substrate 368 of microactuator 360. Spacer layer 377 is approximately 3 micrometers thick in the present invention. It is noted that spacer layer 377 is optional, may be thicker or thinner than the thickness described herein, may be disposed on alternative locations, and as such, neither measurements nor locations described herein should be construed as a limitation.

Microactuator substrate 368 is shown to include a stroke amplification mechanism 374 and a rotational stage device 375, in which rotational stage device 375 includes rotational springs 378 in the present embodiment. Stroke amplification mechanism 374 and rotational stage device 375 (disposed beneath spacer 377) are fabricated within the structure of substrate 368, such that mechanism 374 and device 377 are integrated within substrate 368 of microactuator 360. Stoke amplification mechanism 374 and rotational stage device 377 and their related functions are more thoroughly described in FIG. 4.

With continued reference to FIG. 3, a plurality of flexible wires 351-356 are coupled to an associated bonding pad 361-366, e.g., microactuator bonding pads 261-266 of FIG. 2. Flexible wires 351-356 provide a flexible communicative coupling of slider platform bonding pads 361-366 to substrate bonding pads 331-336 of substrate 368 which provides a communicative coupling to suspension connectors 321-326 for communicative coupling to suspension bonding pads 291-296 of suspension 290 of FIG. 2. Slider platform 370 is typically fabricated from metal. In an embodiment, slider platform 370 comprises a metal, e.g., copper, that is covered in another metal, e.g., gold. It is noted that in alternative embodiments, alternative metals and combinations thereof may be implemented in slider bonding platform 370.

Slider bonding platform 370 is configured to have a read/write transducer, e.g., slider 240 of FIG. 2, bonded and communicatively coupled thereto. Platform 370 has a plurality of bonding platform spacer pads 377 disposed thereon. The material comprising platform 370 can be non-conductive in an embodiment of the present invention. In an alternative embodiment, the material comprising platform 370 may be conductive with an insulation layer on the surface of substrate 368. In an embodiment of the present invention, platform spacer pads 377 may include adhesive properties. In an alternative embodiment, spacer pads 377 may be fabricated as a combined, single piece with bonding platform 370.

Still referring to FIG. 3, shown is PZT 280 configured to be bonded to PZT bonding pads 301 and 303 and substrate 368 of microactuator 360 in an embodiment of the present invention. PZT 280 has a portion thereof, a fixed portion 201, that is bonded in a fixed position, e.g., fixed position 301, relative to substrate 368, and another portion thereof, e.g., non-fixed portion 203, that is bonded in a non-fixed position, e.g., position 303, to a portion of substrate 368 that is configured for movement therewithin, in the present embodiment. PZT 280 is configured to have energy, e.g., voltage, flowed there through so as to cause a dimensional change in PZT 280, shown as stroke 202. As voltage is applied, PZT 280 expands or contracts, and by virtue of having a portion of PZT 280 bonded in a fixed position, e.g., fixed position 201, the expansion or contraction of PZT 280, in a length direction and referred to as a stroke, e.g., stroke 202, is amplified, converted into vertical motion, and subsequently transmitted to rotational stage 375.

Figure 4:
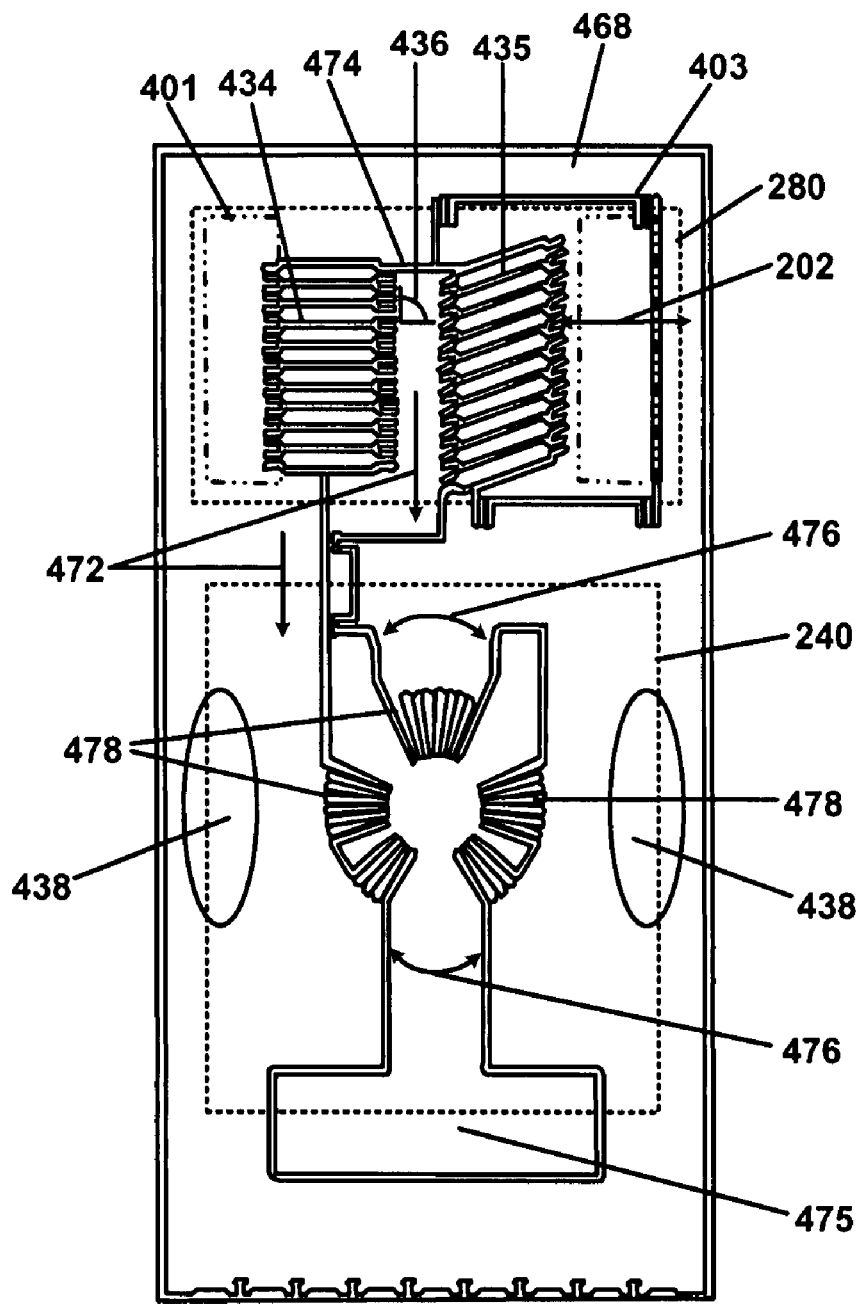
FIG. 4 is a plan view of the substrate of the microactuator of FIG. 2, in an embodiment of the present invention.

FIG. 4 is a plan view of a substrate 468 of a microactuator 460, e.g., substrate 268 of microactuator 260 of FIG. 2, in accordance with an embodiment of the present invention. Substrate 468, analogous to substrate 268 of FIG. 2, and substrate 368 of FIG. 3, is shown to include a stroke amplifier mechanism 474 and a rotational stage 475 including rotation springs 478 disposed there within. In an embodiment of the present invention, amplifier mechanism 474 and rotational stage 475 are integrated within substrate 468, such that mechanism 474 and stage 475 are incorporated into the structure of substrate 468.

Rotational stage 475 includes rotational springs 478 that provide support for rotational stage 475, in the present embodiment. It is further noted that rotational springs 478 are configured and arranged to provide rotational movement, indicated by arrows 476, while being resistant to other movements, e.g., along x, y, z, roll and pitch axes. As such, rotational springs 478 are fabricated in high-aspect ratio shapes, such that springs 478 are narrow and tall, thus providing rotational movement while being resistant to movement along the above described axes.

Accordingly, an etching process that can provide such a high aspect ratio structure, e.g., a silicon deep reactive ion etching (Si-DRIE) process, may be performed on substrate 468 to fabricate mechanism 474 and rotational stage 475 in an embodiment of the present invention. By utilizing an Si-DRIE process, rotational springs 478 having dimensions of approximately 5 micrometers wide and approximately 100 microns tall (a high-aspect ratio of 20:1) can be readily fabricated. In another embodiment, alternative etching processes may be implemented provided those alternative processes can provide analogous structures and ratios.

Still referring to FIG. 4, while structures having a high aspect ratio are described, e.g., rotational springs 478, in conjunction with the Si-DRIE fabrication process performed on substrate 468 of the present embodiment, it is noted that structures having higher or lower ratios can be fabricated in alternative embodiments.

Substrate 468 also includes a stroke amplifier mechanism 474 disposed within substrate 468. In the present embodiment, a Si-DRIE fabrication process, as described above with reference to rotational springs 478, may be utilized to fabricate stroke amplifier mechanism 474. Mechanism 474 includes a non-tilted amplification bar portion 434 and a tilted amplification bar portion 435 in which the amount of tilt provided therewith is adjustable, in an embodiment of the present invention. The angle of tilt, indicated by angle 436, of tilted amplification bar portion 435 relative to non-tilted amplification bar portion 434 determines the amplification factor provided by stroke amplification mechanism 474. It is noted that by providing angle of tilt adjustability, embodiments of the present invention are well suited for implementation in other electrical systems having alternative specifications and characteristics.

In operation, a voltage is applied to a PZT, e.g., PZT 280 of FIG. 2 whose approximate placement on substrate 468 is indicated by a dashed line 280, causing the non-fixed portion (indicated by variably dashed line) 403 to transfer the contraction or expansion of PZT 280, e.g., stroke 202, along the length of PZT 280 to stroke amplification mechanism 474. The dimensional change contained in stroke 202, received by mechanism 474 from PZT 280, is then converted to vertical motion, indicated by arrows 472. The energy of stroke 202, represented by vertical motion arrow 472, is then transmitted to rotational stage 475 such that rotational springs 478 exert a rotational force, arrows 476, upon that which is disposed thereon.

For example, if spacer layer 477 is present upon substrate 468, rotational force 476 would be applied thereto, causing an equivalent rotational force 476 to be transmitted to a slider bonding platform, e.g., slider bonding platform 370 of FIG. 3, and which is indicated by rotational force arrow 376, causing rotation of a slider, e.g., slider 240 of FIG. 2 and whose approximate placement on substrate 468 is indicated by a long dash line 240, that is disposed on slider bonding platform 370, in an embodiment of the present invention. In an alternative embodiment, a slider bonding platform, e.g., slider bonding platform 370 of FIG. 3, may be directly bonded to substrate 468, such that spacer layer 477 is not present. Accordingly, rotational force 476 would then be transmitted directly to slider bonding platform 370, as indicated by rotational force arrow 376 of FIG. 3, and thus causing rotation of a slider, e.g., slider 240 of FIG. 2, bonded thereon.

Figure 5:
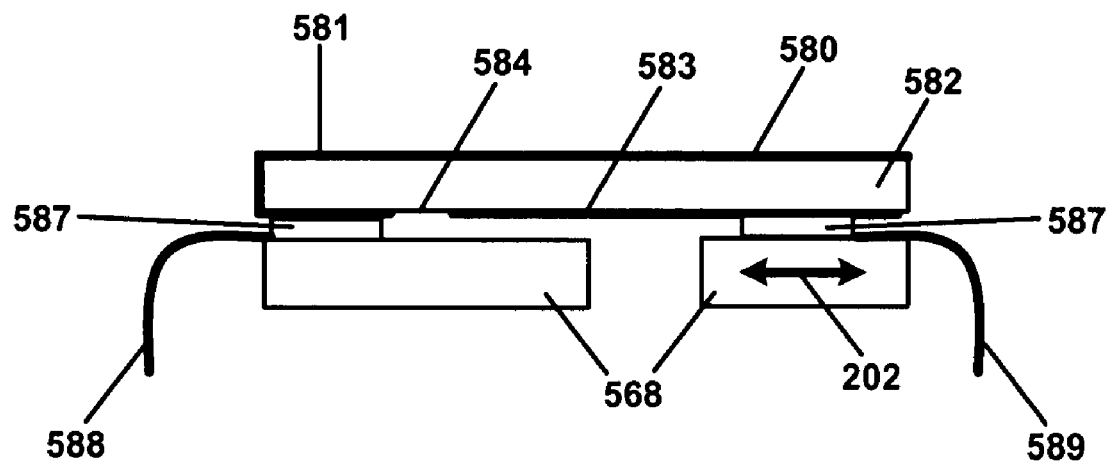
FIG. 5 is a cross section view of a single layer PZT ceramic that is implementable in the microactuator of FIGS. 2, 3 and 4.

FIG. 5 is a profile view of a single layer type piezoelectric ceramic 580, e.g., PZT 280 of FIGS. 2, 3 and 4, bonded to a substrate 568, e.g., substrate 368 and 468 (FIGS. 3 and 4 respectively) in an embodiment of the present invention. FIG. 5 shows a PZT 580 having a ceramic portion 582 having formed about which are metallized layer 581 and metallized layer 583. In an embodiment of the present invention, there is a gap 584 interposed between metallized layer 581 and metallized layer 583. PZT 580 is shown disposed above substrate 568 via bonding pads 587. A plurality of electrodes 588 and 589 provide the electrical connectivity to PZT 580 such that an applied voltage causes a dimensional change, e.g., stroke 502, in PZT 580.

Figure 6:
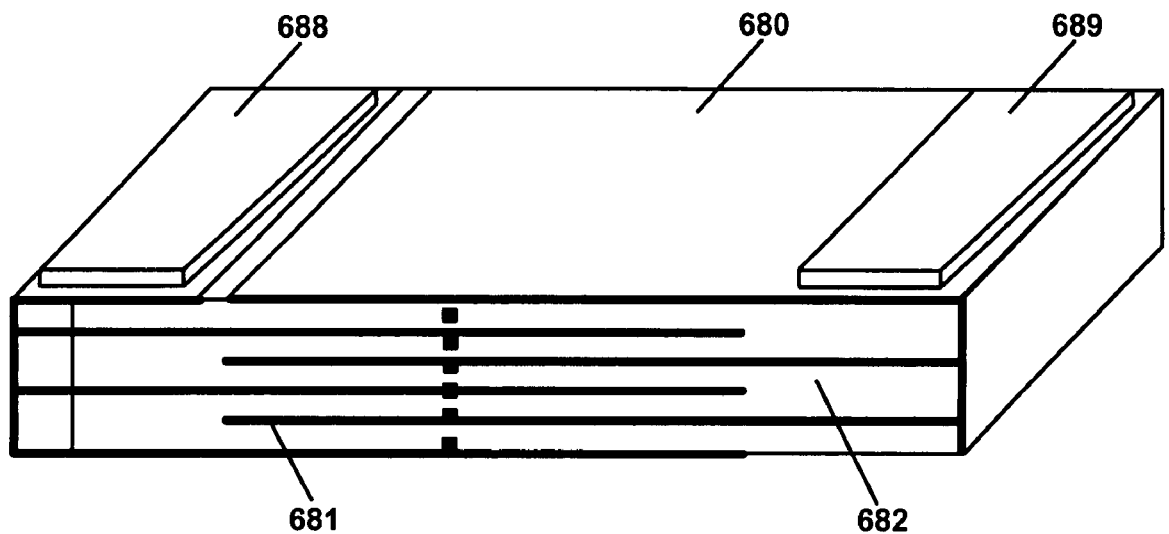
FIG. 6 is a plan view of a multi layer PZT ceramic that is implementable in the microactuator of FIGS. 2, 3 and 4, in an embodiment of the present invention.

FIG. 6 is an angled view of a multi-layer piezoelectric ceramic 680 that is implementable as PZT 280 of FIGS. 2, 3 and 4 in an alternative embodiment of the present invention. FIG. 6 shows PZT 680 to include a plurality of ceramic layers 682 around and among which is a plurality of metallized layers 681. A plurality of electrodes 688 and 689 provide the electrical connectivity to PZT 680, such that an applied voltage causes a dimensional change, e.g., stroke 602, in PZT 680. It is noted that a multi-layer PZT 680 can provide for increased dimensional change, thus increasing the length of the stroke associated therewith.

Figure 7:
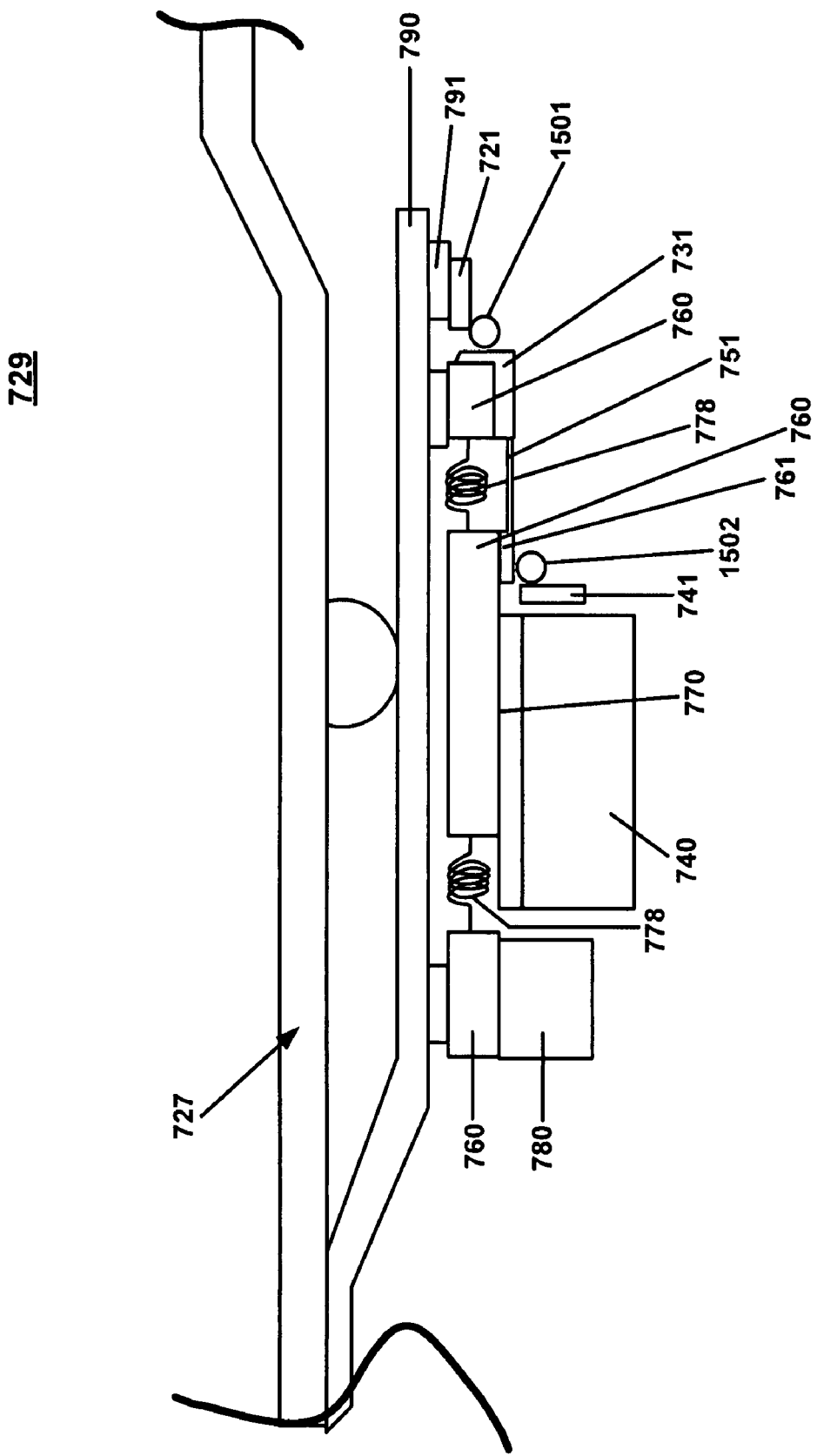
FIG. 7 is a cross section of a HGA assembly illustrating the configuration and communicative coupling of the components and devices contained therein, in an embodiment of the present invention.

FIG. 7 is a cross-section view of components and the electrical connections thereof of a head gimble assembly (HGA) 729, e.g., HGA 129 of FIG. 1 and HGA assembly 229 of FIG. 2, in an embodiment of the present invention. HGA 729 is shown to include a load beam 727 having a flexure 790 coupled thereto. Flexure 790 shows one of a plurality of suspension bonding pads 721-726, e.g., suspension bonding pad 721.

Bonded to flexure 790 is a microactuator 760, e.g., microactuators 260, 360 and 460 of FIGS. 2, 3 and 4, respectively. Bonded to microactuator 760 is a slider 740, e.g., slider 240 of FIG. 2, and a PZT 780, e.g., PZT 280, 380, 480, 580 and 680 of FIGS. 2, 3, 4, 5 and 6, respectively. Slider 740 shows one of a plurality of transducer bonding pads 741-746, e.g., transducer bonding pad 741.

In the present embodiment, slider bonding platform 770 is shown interposed between slider 740 and microactuator 760. Slider bonding platform 770 shows one of a plurality of slider bonding pads 761-766, e.g., slider bonding pad 761, one of a plurality of flexible wires 751-756, e.g., flexible wire 751, and one of a plurality of platform bonding pads 731-736, e.g., platform bonding pad 731 that is integrated with one of a plurality of suspension connectors 721-726, e.g., suspension connector 721.

Still referring to FIG. 7, a solder joint 1502, located at the junction of transducer bonding pad 741 of slider 740 and slider bonding pad 761 of microactuator 760, provides the intercommunicative coupling of slider 740 and microactuator 760. Another solder joint 1501, located at the junction of suspension connector 721 and flexure bonding pad 731 provides the intercommunicative coupling of microactuator 760 and flexure 790. As such, microactuator 760, in conjunction with solder joints 1502 and 1501, provides intercommuncative coupling between flexure 790 and slider 740.

Figure 8:
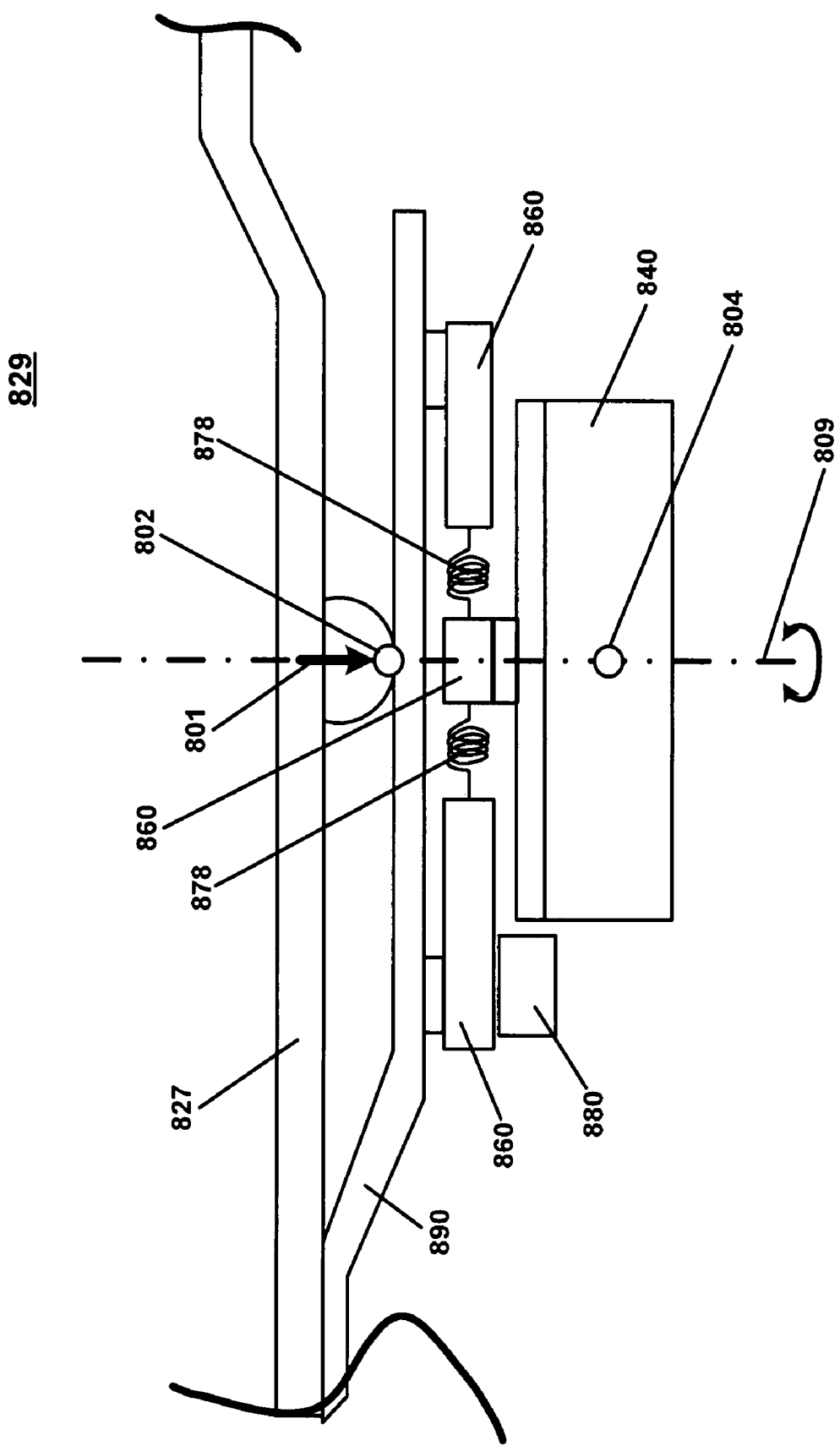
FIG. 8 is a cross section of an HGA assembly illustrating a center of rotation axis selection process having been performed thereon in accordance with an embodiment of the present invention.

FIG. 8 is a profile view of a head gimble assembly (HGA) 829, e.g., HGA 129 of FIG. 1, HGA assembly 229 of FIG. 2 and HGA 729 of FIG. 7 in which communicative interconnects are not shown, illustrating center-of-rotation location selectability in accordance with an embodiment of the present invention. HGA 829 includes a flexure 890, a load beam 827, a microactuator 860 with a PZT 880 and a slider 840 in an embodiment of the present invention.

Further shown are a loading force 801 and an associated dimple point 802, an axis center of rotation 809 and a center of mass of moving object 804. Loading force 801, generated by load beam 827, is focused on a point on suspension 890, e.g., dimple point 802.

FIG. 8 shows that loading force 801 and dimple point 802 approximately align with center of mass of moving component 804. As such, the center of rotation axis 809 is configured to align with dimple point 802 and center of mass 804, in this embodiment of the present invention.

Figure 9:
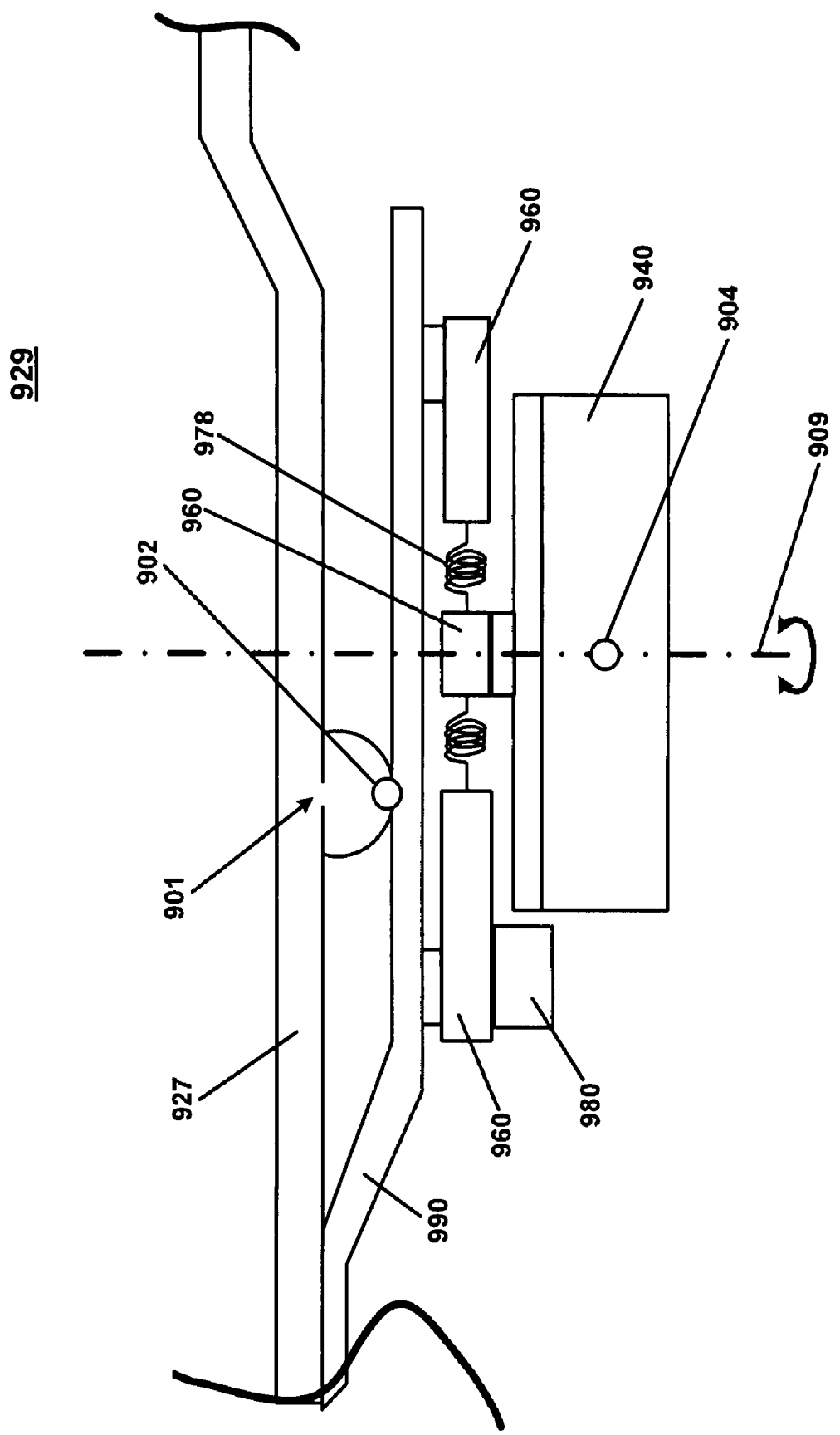
FIG. 9 is a cross section of an HGA assembly illustrating a center of rotation axis selection process having been performed thereon in accordance with another embodiment of the present invention.

FIG. 9 is a profile view of a head gimble assembly (HGA) 929, e.g., HGA 129 of FIG. 1, HGA assembly 229 of FIG. 2 and HGA 729 of FIG. 7 in which communicative interconnects are not shown, illustrating center-of-rotation location selectability in accordance with another embodiment of the present invention. HGA 929 includes a flexure 990, a load beam 927, a microactuator 960 with a PZT 980 and a slider 940 in an embodiment of the present invention.

Further shown are a loading force 901 and an associated dimple point 902, an axis center of rotation 909 and a center of mass of moving object 904. Loading force 901, generated by load beam 927, is focused on a point on suspension 990, e.g., dimple point 902.

FIG. 9 shows that loading force 901 and dimple point 902 are not aligned with the center of mass of moving component point 904. Further shown is that dimple point 902 is shifted away from center of mass of moving component point 904. As such, the center of rotation axis 909 is configured to align with center of mass 904, in this embodiment of the present invention. Aligning center of rotation axis 909 with center of mass of moving component 904 provides minimizing counter force generated by an actuator, e.g., actuator 121 of FIG. 1, because the mass is balanced along center of rotation axis 909, in accordance with this embodiment of the present invention.

Figure 10:
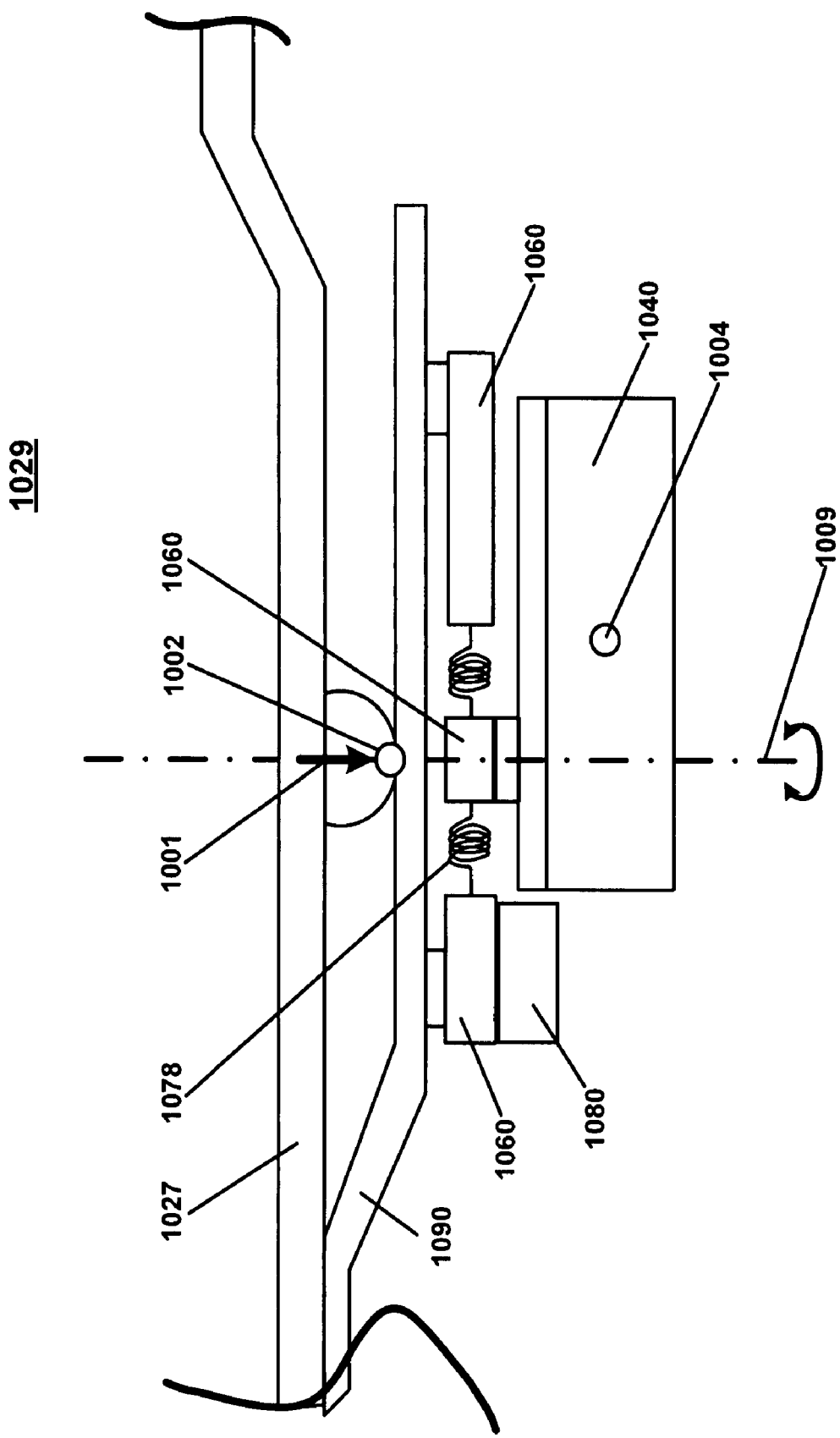
FIG. 10 is a cross section of an HGA assembly illustrating a center of rotation axis selection process having been performed thereon in accordance with yet another embodiment of the present invention.

FIG. 10 is a profile view of a head gimble assembly (HGA) 1029, e.g., HGA 129 of FIG. 1, HGA assembly 229 of FIG. 2 and HGA 729 of FIG. 7 in which communicative interconnects are not shown, illustrating center-of-rotation location selectability in accordance with still another embodiment of the present invention. HGA 1029 includes a flexure 1090, a load beam 1027, a microactuator 1060 with a PZT 1080 and a slider 1040 in an embodiment of the present invention.

Further shown are a loading force 1001 and an associated dimple point 1002, an axis center of rotation 1009 and a center of mass of moving component 1004. Loading force 1001, generated by load beam 1027, is focused on a point on suspension 1090, e.g., dimple point 1002.

FIG. 10 shows that loading force 1001 and dimple point 1002 are not aligned with the center of mass of moving component point 1004. Further shown is that dimple point 1002 is shifted away from center of mass of moving component point 1004. As such, the center of rotation axis 1009 is configured to align with dimple point 1002 and loading force 1001 and not center of mass of moving component 1004. Aligning center of rotation axis 1009 with dimple point 1002 and loading force 1001 provides that the loading force 1001 is applied at the axis of center of rotation, which provides a mechanically stable configuration, in the present embodiment.

Figure 11:
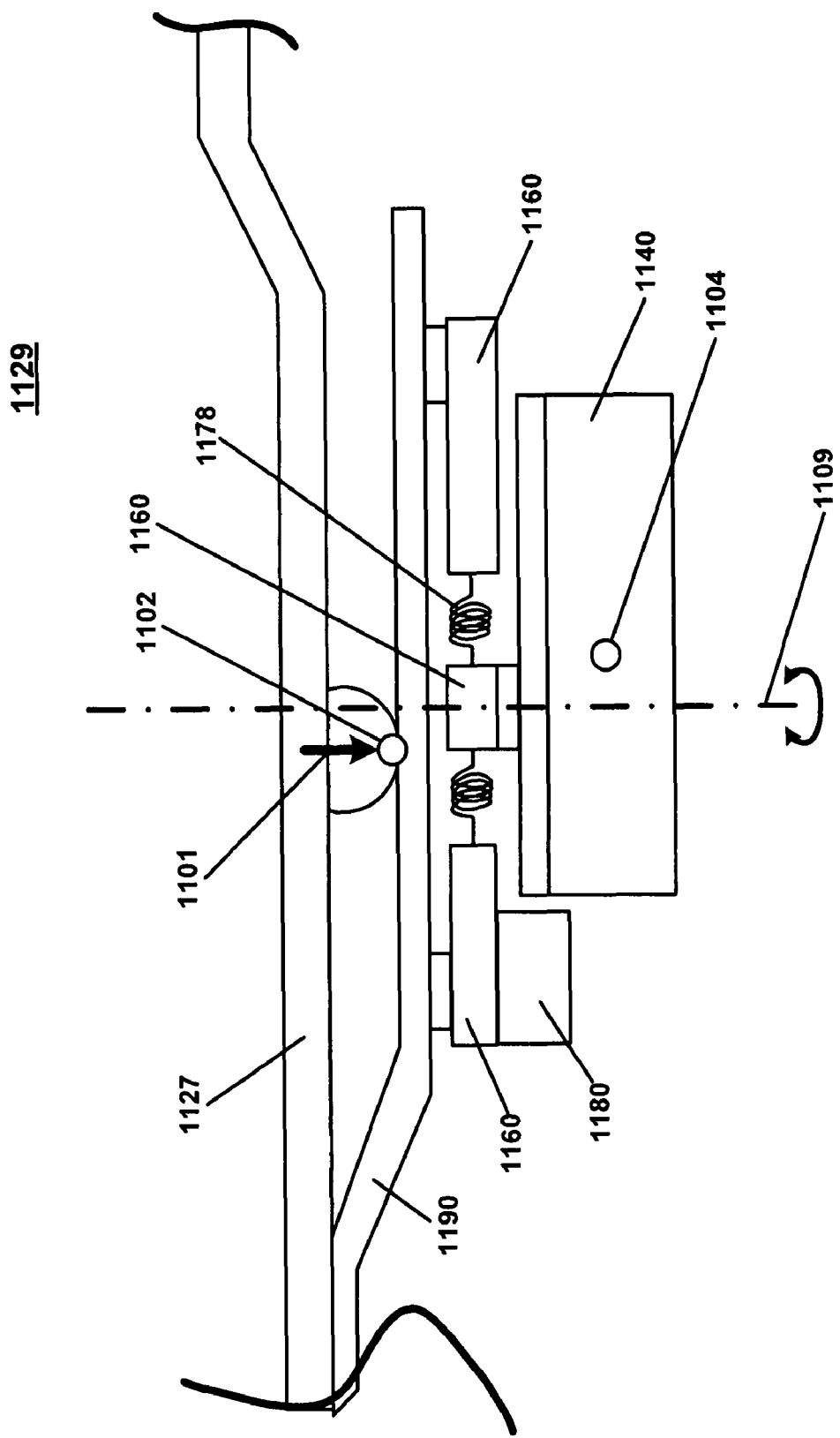
FIG. 11 is a cross section of an HGA assembly illustrating a center of rotation axis selection process having been performed thereon in accordance with an embodiment of the present invention.

FIG. 11 is a profile view of a head gimble assembly (HGA) 1129, e.g., HGA 129 of FIG. 1, HGA assembly 229 of FIG. 2 and HGA 729 of FIG. 7 in which communicative interconnects are not shown, illustrating center-of-rotation location selectability in accordance with still yet another embodiment of the present invention. HGA 1129 includes a flexure 1190, a load beam 1127, a microactuator 1160 with a PZT 1180 and a slider 1140 in an embodiment of the present invention.

Further shown are a loading force 1101 and an associated dimple point 1102, an axis center of rotation 1109 and a center of mass of moving component 1104. Loading force 1101, generated by load beam 1127, is focused on a point on suspension 1190, e.g., dimple point 1102.

FIG. 11 shows that loading force 1001 and dimple point 1002 are not aligned with the center of mass of moving component point 1104. Further shown is that dimple point 1102 is shifted away from center of mass of moving component point 1104. As such, the center of rotation axis 1109 is configured to be interposed between dimple point 1102 and loading force 1101 and center of mass of moving component 1104. Interposing axis center of rotation 1109 between dimple point 1002 and center of mass of moving component 1104 can provide a center of rotation axis that achieves a combination of actuator counter force minimization and mechanical stability, in the present embodiment.

Figure 12:
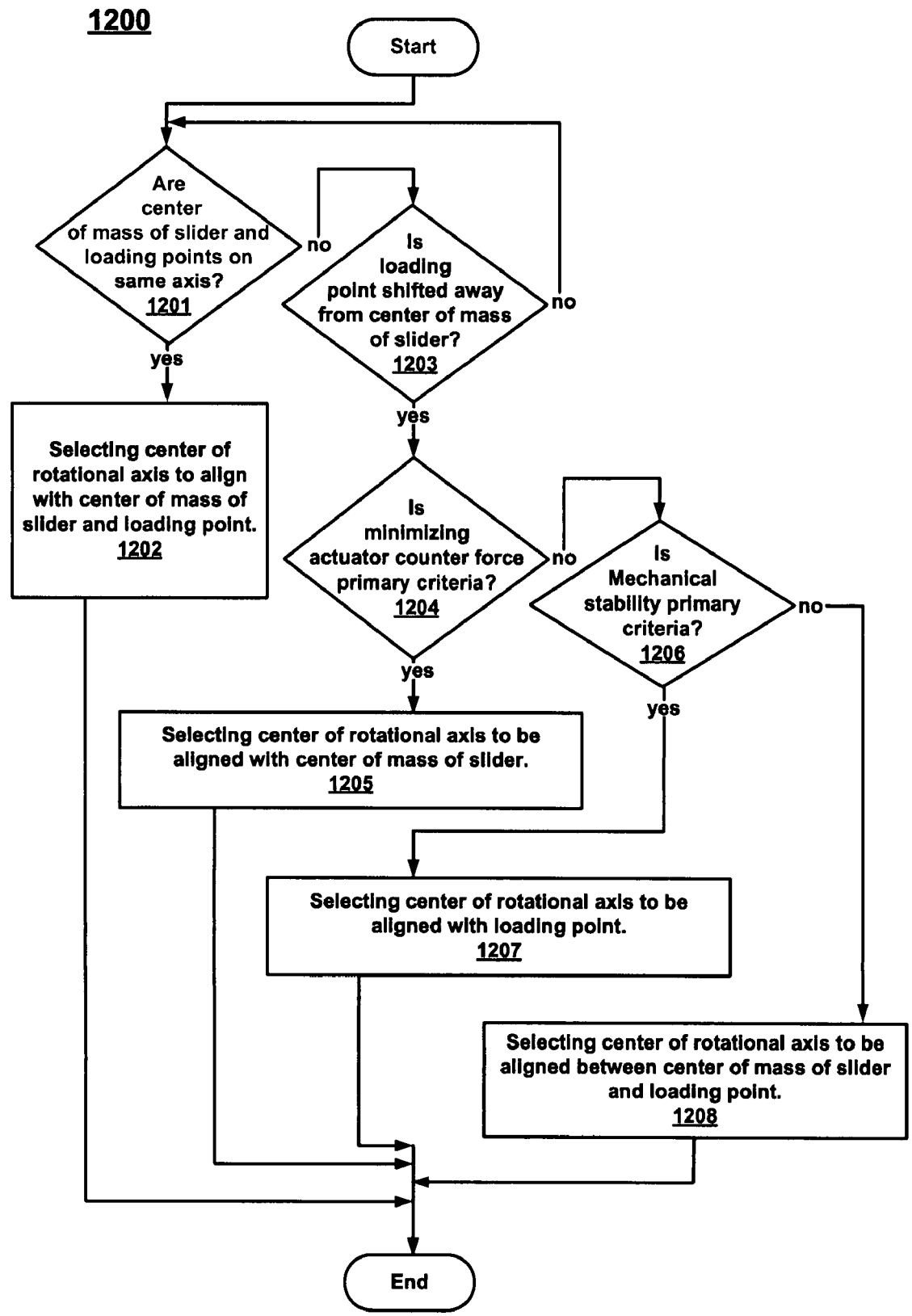
FIG. 12 is flowchart of a process for selecting a center of rotation axis in accordance with embodiments of the present invention.

FIG. 12 is a flowchart of a process 1200 for selecting a rotational stage for a microactuator in an embodiment of the present invention. FIG. 12 is a flow chart of a process 1200 in which particular steps are performed in accordance with an embodiment of the present invention for a microactuator having a selectable axis center of rotation. Although specific steps are disclosed in process 1200, such steps are exemplary. That is, the present invention is well suited to performing various other steps or variations of the steps recited in FIG. 12. Within the present embodiment, it should be appreciated that the steps of process 1200 may be performed by software, by hardware, by an assembly mechanism, through human interaction, or by any combination of software, hardware, assembly mechanism, and human interaction.

Process 1200 will be described with reference to components and devices shown in FIGS. 8, 9, 10 and 11.

In step 1201 of process 1200 selecting a rotational stage, it needs to be determined if the center of mass of the slider is on the same axis as the point of loading force applied to a slider. If so, the process then proceeds to step 1202. If the center of mass of the slider is not on the same axis as the point of loading force applied to the slider, the process then proceeds to step 1203.

In step 1202 of process 1200, and with reference to FIG. 8, by virtue of the determination that the center of mass 804 of the slider 840 is on the same axis as the point of loading force applied to a slider 801, the center of rotational axis 809 is selected to be aligned with the center of mass of the slider and the point of loading force applied to a slider, as shown in FIG. 8, in an embodiment of the present invention.

In step 1203 of process 1200, it needs to be determined if the point of loading force applied to a slider has been shifted away from the center of mass of the slider. If so, the process then proceeds to step 1204. If the point of loading force applied to the slider has not shifted away from the center of mass of the slider, the process then returns to step 1201.

In step 1204 of process 1200, it needs to be determined if minimizing the counter force generated by an actuator is the main criteria for selecting a rotational stage. If minimizing the actuator's counter force is a primary criterion, process 1200 proceeds to step 1205. If the primary criterion is not minimizing counter force caused by the actuator, process 1200 proceeds to step 1206.

In step 1205 of process 1200, with reference to FIG. 9, it has been determined that minimizing the counter force generated by the actuator is a primary criteria in selecting a rotational stage. Accordingly, center of rotation axis 909 is selected to be aligned with the center of the mass 904 of the slider 940, thus balancing the slider along the center of rotation axis 909, thereby minimizing counter force generated by the motion of the actuator in an embodiment of the present invention and as described in FIG. 9.

In step 1206 of process 1200, it needs to be determined if mechanical stability is a primary criteria for selecting the rotational stage. If mechanical stability is a primary criterion for selecting the rotational stage, process 1200 proceeds to step 1207. If mechanical stability is not a primary criteria for selecting the rotational stage, the process 1200 proceeds to step 1208 in an embodiment of the present invention.

In step 1207, it has been determined that mechanical stability is a primary criterion in selecting the rotational stage. Accordingly, and with reference to FIG. 10, the center of rotation axis 1009 is selected to be aligned with the point of loading force 1001 applied to a slider 1040 such that the center of rotation axis 1009 is not aligned with the center of mass 1004 of slider 1040, in accordance with an embodiment of the present invention. Because loading force 1001 is applied aligned with center of rotation axis 1009, this embodiment provides mechanical stability, as shown in FIG. 10.

In step 1208, it has been determined that neither minimizing actuator's counter force nor achieving mechanical stability are a primary criteria, it can be interpreted that a compromise is to be made between mechanical stability and minimizing actuator' counter force, with reference to FIG. 11. As such, center of rotation axis 1109 is located at a point interposed between point of loading force 1101 applied to a slider 1140 and center of mass 1104 of slider 1140, as shown in FIG. 12 and in accordance with an embodiment of the present invention.

Embodiments of the present invention, in the various presented embodiments, allows for the selection of a rotational stage for a center of rotation axis. Embodiments of the present invention further provide a center of rotation axis that can be adjusted to various criteria including, but not limited to, minimizing actuator counter force, maximizing mechanical stability and achieving a compromise between the criteria.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A microactuator substrate comprising:
    a stroke amplifier, said stroke amplifier for generating an amount of amplified motion converted from a force received thereon;
    a rotating device coupled to said stroke amplifier, said rotating device comprising supporting rotational springs, said rotating device separate and independent from said stroke amplifier and having a center of rotation substantially proximal to a center of mass of an object disposable thereon, said rotating device for causing a rotation in a portion of said substrate upon receiving said amplified motion; and
    a piezoelectric actuator coupled to said stroke amplifier for generating said force, wherein said stroke amplifier and said rotating device are integrated within said substrate.

2. The microactuator substrate of claim 1 wherein said stroke amplifier further comprises amplification adjustability, wherein said amount of amplified motion generated is variable.

3. The microactuator substrate of claim 1 further comprising:
    a high-aspect ratio structure for said stroke amplifier and said rotator device, said stroke amplifier and said rotator achieved via a silicon deep reactive etching (Si-DRIE) process performed on said substrate.

4. The microactuator substrate of claim 1 wherein rotator device provides support for and rotational movement to said substrate in conjunction with said force received upon said stroke amplifier.

5. A microactuator comprising:
    a substrate having a rotational spring mechanism and a stroke amplification mechanism integrated therewithin;
    a slider bonding platform coupled to a movement capable portion of said substrate;
    a bonding pad disposed on said movement capable portion of said substrate, said bonding pad coupleable to said slider bonding platform, wherein a slider is coupleable to said substrate via said slider bonding platform, said slider a moving part;
    a second bonding pad disposed on said substrate, said second bonding pad capable of being coupled to a suspension bonding pad, said suspension coupleable to said substrate via said suspension bonding pad;
    a set of interconnecting lines for communicatively coupling said bonding pad with said second bonding pad; and
    a force generating device coupled to said stroke amplification mechanism.

6. The microactuator as recited in claim 5 further comprising:
    a rotational stage having a center of gravity of said moving part as center of rotational axis.

7. The microactuator as recited in claim 5 further comprising:
    a rotational stage having a loading point of said suspension as center of rotational axis.

8. The microactuator as recited in claim 5 further comprising:
    a rotational stage having a center of rotation axis between center of gravity of said moving part and a loading point of said suspension as center of rotational axis.

9. The microactuator of claim 5 wherein substrate is formed by silicon deep reactive etching (Si-DRIE).

* * * * *